US009261583B2

(12) United States Patent
Balaji et al.

(10) Patent No.: US 9,261,583 B2
(45) Date of Patent: Feb. 16, 2016

(54) SYSTEMS AND METHODS FOR CALIBRATING DUAL POLARIZATION RADAR SYSTEMS

(71) Applicants: Mrinal Singh Balaji, Huntsville, AL (US); John R. Eillis, Decatur, AL (US); R. Darrin Cartwright, Norman, OK (US); William H. Walker, Madison, AL (US)

(72) Inventors: Mrinal Singh Balaji, Huntsville, AL (US); John R. Eillis, Decatur, AL (US); R. Darrin Cartwright, Norman, OK (US); William H. Walker, Madison, AL (US)

(73) Assignee: Baron Services, Inc., Huntsville, AL (US)

( * ) Notice: Subject to any disclaimer, the term of this patent is extended or adjusted under 35 U.S.C. 154(b) by 327 days.

(21) Appl. No.: 13/755,388

(22) Filed: Jan. 31, 2013

(65) Prior Publication Data

US 2014/0210661 A1 Jul. 31, 2014

Related U.S. Application Data

(63) Continuation-in-part of application No. 13/441,419, filed on Apr. 6, 2012.

(60) Provisional application No. 61/472,773, filed on Apr. 7, 2011.

(51) Int. Cl.
*G01S 7/40* (2006.01)
*G01S 13/95* (2006.01)
*G01S 7/02* (2006.01)
*G01S 7/41* (2006.01)

(52) U.S. Cl.
CPC ............... *G01S 7/025* (2013.01); *G01S 7/4021* (2013.01); *G01S 7/411* (2013.01); *G01S 13/95* (2013.01)

(58) Field of Classification Search
CPC ....... G01S 7/025; G01S 13/95; G01S 7/4021; G01S 7/411
USPC ..................... 342/26 R, 26 A–26 D, 174, 188
See application file for complete search history.

(56) References Cited

U.S. PATENT DOCUMENTS 6,061,013 A * 5/2000 Sauvageot et al. .......... 342/26 R
6,473,026 B1 * 10/2002 Ali-Mehenni et al. ...... 342/26 R (Continued)

*Primary Examiner* — John B Sotomayor
(74) *Attorney, Agent, or Firm* — Maynard Cooper & Gale, P.C.; Jon E. Holland

(57) ABSTRACT

A dual polarization radar system is calibrated based on real-time data measurements, such as measured horizontal and vertical reflectivities, $Z_H$ and $Z_V$. In this regard, the radar system analyzes the reflected power measurements to identify which measurements are associated with reflections from a respective spherical object. Using such measurements, the system determines a system differential reflectivity value, and combines such value with reflected power measurements for calibration. Since the calibration is based on real-time data measurements, the calibration process may run simultaneously with the collection of weather data. Thus, it is unnecessary to suspend weather monitoring activities in order to perform the calibration, and the calibration can be run as often as is desired without interfering with such weather monitoring activities. Further, the calibration process is immune to the weather events within range of the radar system. Accordingly, it is possible for the calibration to be performed at any time and without interfering with the weather monitoring activities regardless of the types of weather events occurring within the vicinity of the radar system.

21 Claims, 15 Drawing Sheets

(56) References Cited

U.S. PATENT DOCUMENTS

| | | | |
|---|---|---|---|
| 7,242,343 B1* | 7/2007 | Woodell | 342/26 B |
| 7,345,625 B1* | 3/2008 | Urkowitz | 342/174 |
| 7,589,666 B2* | 9/2009 | Passarelli et al. | 342/196 |
| 9,097,805 B2 | 8/2015 | Balaji et al. | |
| 2009/0315762 A1* | 12/2009 | Venkatachalam et al. | 342/26 R |
| 2011/0102249 A1* | 5/2011 | Venkatachalam et al. | 342/26 R |
| 2012/0256785 A1* | 10/2012 | Balaji et al. | 342/174 |
| 2014/0210661 A1* | 7/2014 | Balaji et al. | 342/174 |

* cited by examiner

| Bin | $Z_H$ | $Z_V$ | $\varphi_H$ | $\varphi_V$ | Azimuth Angle | Elevation Angle |
|---|---|---|---|---|---|---|
| 1 | $Z_{H1}$ | $Z_{V1}$ | $\varphi_{H1}$ | $\varphi_{V1}$ | $AA_1$ | $EA_1$ |
| 2 | $Z_{H2}$ | $Z_{V2}$ | $\varphi_{H2}$ | $\varphi_{V2}$ | $AA_1$ | $EA_1$ |
| 3 | $Z_{H3}$ | $Z_{V3}$ | $\varphi_{H3}$ | $\varphi_{V3}$ | $AA_1$ | $EA_1$ |
| 4 | $Z_{H4}$ | $Z_{V4}$ | $\varphi_{H4}$ | $\varphi_{V4}$ | $AA_1$ | $EA_1$ |
| 5 | $Z_{H5}$ | $Z_{V5}$ | $\varphi_{H5}$ | $\varphi_{V5}$ | $AA_1$ | $EA_1$ |
| 1 | $Z_{H6}$ | $Z_{V6}$ | $\varphi_{H6}$ | $\varphi_{V6}$ | $AA_2$ | $EA_1$ |
| 2 | $Z_{H7}$ | $Z_{V7}$ | $\varphi_{H7}$ | $\varphi_{V7}$ | $AA_2$ | $EA_1$ |
| 3 | $Z_{H8}$ | $Z_{V8}$ | $\varphi_{H8}$ | $\varphi_{V8}$ | $AA_2$ | $EA_1$ |
| 4 | $Z_{H9}$ | $Z_{V9}$ | $\varphi_{H9}$ | $\varphi_{V9}$ | $AA_2$ | $EA_1$ |
| 5 | $Z_{H10}$ | $Z_{V10}$ | $\varphi_{H10}$ | $\varphi_{V10}$ | $AA_2$ | $EA_1$ |

*FIG. 5*

| Bin | H-Channel ($Z_{HH}$) | V-Channel ($Z_{VH}$) | $\varphi_{HH}$ | $\phi_{VH}$ | Azimuth Angle | Elevation Angle |
|---|---|---|---|---|---|---|
| 1 | $Z_{HH1}$ | $Z_{VH1}$ | $\varphi_{HH1}$ | $\phi_{VH}$ | $AA_1$ | $EA_1$ |
| 2 | $Z_{HH2}$ | $Z_{VH2}$ | $\varphi_{HH2}$ | $\phi_{VH}$ | $AA_1$ | $EA_1$ |
| 3 | $Z_{HH3}$ | $Z_{VH3}$ | $\varphi_{HH3}$ | $\phi_{VH}$ | $AA_1$ | $EA_1$ |
| 4 | $Z_{HH4}$ | $Z_{VH4}$ | $\varphi_{HH4}$ | $\phi_{VH}$ | $AA_1$ | $EA_1$ |
| 5 | $Z_{HH5}$ | $Z_{VH5}$ | $\varphi_{HH5}$ | $\phi_{VH}$ | $AA_1$ | $EA_1$ |
| 1 | $Z_{HH6}$ | $Z_{VH6}$ | $\varphi_{HH6}$ | $\phi_{VH}$ | $AA_2$ | $EA_1$ |
| 2 | $Z_{HH7}$ | $Z_{VH7}$ | $\varphi_{HH7}$ | $\phi_{VH}$ | $AA_2$ | $EA_1$ |
| 3 | $Z_{HH8}$ | $Z_{VH8}$ | $\varphi_{HH8}$ | $\phi_{VH}$ | $AA_2$ | $EA_1$ |
| 4 | $Z_{HH9}$ | $Z_{VH9}$ | $\varphi_{HH9}$ | $\phi_{VH}$ | $AA_2$ | $EA_1$ |
| 5 | $Z_{HH10}$ | $Z_{VH10}$ | $\varphi_{HH10}$ | $\phi_{VH}$ | $AA_2$ | $EA_1$ |

| Bin | H-Channel ($Z_{HV}$) | V-Channel ($Z_{VV}$) | $\varphi_{HV}$ | $\phi_{VV}$ | Azimuth Angle | Elevation Angle |
|---|---|---|---|---|---|---|
| 1 | $Z_{VH1}$ | $Z_{VV1}$ | $\varphi_{HV1}$ | $\phi_{VV}$ | $AA_1$ | $EA_1$ |
| 2 | $Z_{VH2}$ | $Z_{VV2}$ | $\varphi_{HV2}$ | $\phi_{VV}$ | $AA_1$ | $EA_1$ |
| 3 | $Z_{VH3}$ | $Z_{VV3}$ | $\varphi_{HV3}$ | $\phi_{VV}$ | $AA_1$ | $EA_1$ |
| 4 | $Z_{VH4}$ | $Z_{VV4}$ | $\varphi_{HV4}$ | $\phi_{VV}$ | $AA_1$ | $EA_1$ |
| 5 | $Z_{VH5}$ | $Z_{VV5}$ | $\varphi_{HV5}$ | $\phi_{VV}$ | $AA_1$ | $EA_1$ |
| 1 | $Z_{VH6}$ | $Z_{VV6}$ | $\varphi_{HV6}$ | $\phi_{VV}$ | $AA_2$ | $EA_1$ |
| 2 | $Z_{VH7}$ | $Z_{VV7}$ | $\varphi_{HV7}$ | $\phi_{VV}$ | $AA_2$ | $EA_1$ |
| 3 | $Z_{VH8}$ | $Z_{VV8}$ | $\varphi_{HV8}$ | $\phi_{VV}$ | $AA_2$ | $EA_1$ |
| 4 | $Z_{VH9}$ | $Z_{VV9}$ | $\varphi_{HV9}$ | $\phi_{VV}$ | $AA_2$ | $EA_1$ |
| 5 | $Z_{VH10}$ | $Z_{VV10}$ | $\varphi_{HV10}$ | $\phi_{VV}$ | $AA_2$ | $EA_1$ |

*FIG. 14*

SYSTEMS AND METHODS FOR CALIBRATING DUAL POLARIZATION RADAR SYSTEMS

CROSS REFERENCE TO RELATED APPLICATION

This application claims priority to and is a continuation-in-part of U.S. patent application Ser. No. 13/441,419, entitled "Systems and Methods for Calibrating Dual Polarization Radar Systems" (now U.S. Pat. No. 9,097,805), which claims priority to U.S. Provisional Patent Application No. 61/472,773, entitled "Systems and Methods for Calibrating Dual Polarization Radar Systems" and filed on Apr. 7, 2011, both of which are incorporated herein by reference.

RELATED ART

A dual polarization radar system transmits and measures the reflectivity of at least two waveforms, often a horizontally polarized waveform and a vertically polarized waveform. The difference between the horizontal reflectivity ($Z_H$), which is a measure of the reflected power in the horizontally polarized return, and the vertical reflectivity ($Z_V$), which is a measure of the reflected power in the vertically polarized return, is indicative of the shape of the radar target from which the waveforms are reflected, and this difference, referred to as "differential reflectivity" or "$Z_{DR}$," can be used to discern the type of meteorological scatterer, such as rain, sleet, hail, or snow or non-meteorological scatterers such as birds and insects.

Some dual polarization radar systems simultaneously transmit horizontally polarized and vertically polarized waveforms. However, some dual polarization radar systems may transmit one waveform having a particular polarization and receive reflections from the transmitted waveform in two channels, for example a channel for horizontally polarized reflections and vertically polarized reflections. Those reflections having the same polarization as the transmitted waveform are often referred to as co-polarized components, and those reflections having opposite polarizations than the transmitted waveform are often referred to as cross-polarized. Each are received by a separate channel. In such a system, the ratio of the power of the received reflections is referred to as linear depolarization ratio ($L_{DR}$). The $L_{DR}$ may also be used to discern the type of meteorological scatterer, such as rain, sleet, hail, or snow or non-meteorological scatterers such as birds and insects.

In transmitting pulses and measuring returns, a radar system may introduce error causing inaccuracies in the raw measurement data. To compensate for such error, a system differential reflectivity value is typically determined via a calibration process, and the system differential reflectivity value is subtracted from differential reflectivity measurements thereby providing more accurate results.

The error introduced by the system may drift or change over time, and the calibration process would ideally be performed often. However, many conventional calibration processes cannot be performed while data is being gathered. That is, the normal operation of the radar system must be undesirably suspended in order to perform the calibration process. In addition, many conventional calibration processes are limited in the times that they can be performed such that the calibration process is performed less frequently than might be desired.

As an example, one conventional calibration process takes advantage of the shape of falling raindrops in order to perform calibration. In this regard, a falling raindrop generally has a perfectly round shape when it is viewed from directly underneath due to symmetries in the effects of air resistance as the raindrop falls. The difference between the horizontal and vertical reflectivities of a falling raindrop, when measured directly underneath, is ideally zero since the discernable shape of the raindrop should be perfectly round. Thus, the actual measured reflectivity difference is indicative of the system error.

Unfortunately, for such calibration, the antenna of the radar system must be pointed to the raindrops directly above the antenna during the calibration thereby preventing the radar system from collecting data from geographic regions typically scanned by the system. In addition, to provide optimum results, the measured raindrops should be within a certain size range, and there may a relatively long time between weather events that produce rain of the desired size directly over the radar system. Indeed, in some geographic regions, opportunities to calibrate the radar system may be months apart. During the interim, the calibration process is not usually performed adversely affecting the accuracy of the data collected by the radar system.

In another conventional calibration process, the antenna of a radar system is pointed toward the Sun during certain times of the day. For the calibration process to be successful, the Sun should be at a certain elevation relative to the radar system, and the times at which the calibration process can be run are thus limited. Depending on the weather events and cloud coverage, the Sun may not be viewable from the radar system while it is at the desired elevation thereby preventing the radar system from performing the calibration. In addition, when the calibration is being performed, the radar system is unable to collect data from geographic regions typically scanned by the system.

Thus a heretofore unaddressed need exists for a calibration process for dual polarization radar systems that can be performed more frequently and in the presence of various types of weather. It would be desirable for such a calibration process to allow data collection while the calibration is being performed so that the normal operation of the system does not need to be suspended for the calibration process.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIG. 5 depicts exemplary raw measurement data collected by a dual polarization radar system, such as is depicted by FIG. 1.

FIG. 10 depicts exemplary raw measurement data collected by a horizontal channel of a dual polarization radar system, such as is depicted by FIG. 1.

FIG. 14 depicts exemplary raw measurement data collected by a vertical channel of a dual polarization radar system, such as is depicted by FIG. 1.

DETAILED DESCRIPTION

Figure 1:
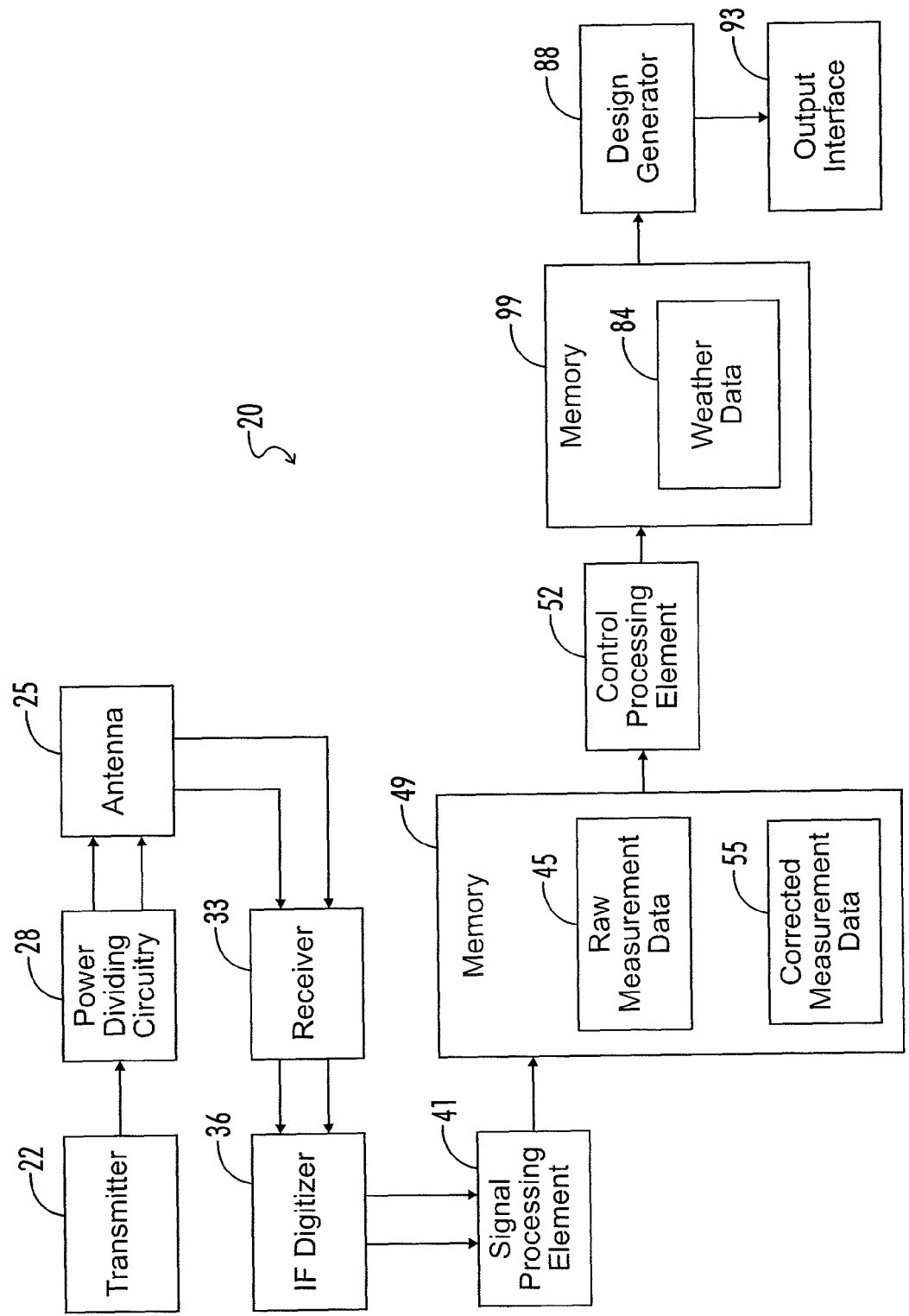
FIG. 1 is a block diagram illustrating an exemplary embodiment of a dual polarization radar system.

The present disclosure generally relates to systems and methods for calibrating dual polarization radar systems. In one exemplary embodiment, a dual polarization radar system is calibrated based on real-time data measurements, such as measured horizontal and vertical reflectivities, $Z_H$ and $Z_V$. In this regard, the radar system analyzes the reflected power measurements to identify which measurements are associated with reflections from spherical objects.

For simultaneous transmission systems, the differential reflectivity $Z_{DR}$ is ideally equal to zero, and the differential reflectivity indicated by the identified measurements is attributable to the system's differential reflectivity ($Z_{DR\_system}$). In this regard, for an actual differential reflectivity measurement, the measured differential reflectivity ($Z_{DR}$) can be expressed according to the following equation:

$$Z_{DR}=(Z_H-Z_V)+Z_{DR\_System}. \text{ [in dB]}$$

For a perfectly spherical target, $(Z_H-Z_V)$ should be equal to zero such that the measured $Z_{DR}$ should be equal to $Z_{DR\_system}$. This radar system induced bias ($Z_{DR\_system}$) should be corrected for in order to provide accurate weather data.

Since the calibration is based on real-time data measurements, the calibration process may run simultaneously with the collection of weather data. Thus, it is unnecessary to suspend weather monitoring activities in order to perform the calibration, and the calibration can be run as often as is desired without interfering with such weather monitoring activities. Further, the calibration process is immune to the weather events within range of the radar system. Specifically, the calibration process can be used when the scatterers constitute, rain, snow, hail, and/or sleet, regardless of the range and size of the scatterers. In fact, returns from a spherical object of any type, even ground clutter returns, can be used for the calibration, and the calibration therefore can be performed in clear weather conditions. Accordingly, it is possible for the calibration to be performed at any time and without interfering with the weather monitoring activities regardless of the types of weather events occurring within the vicinity of the radar system.

Note that there are a variety of techniques that can be employed to identify which measurements are associated with returns from spherical objects. In one exemplary embodiment, the measured two-way phase shift of the horizontally polarized waveform and the vertically polarized waveform is used to discern which measurements are indicative of spherical objects. In this regard, differential propagation phase shift ($\phi_{DP}$) is defined as the difference between the two-way phase angles ($\phi_H$ and $\phi_V$), in degrees, of the radar signals received from horizontally and vertically polarized waveforms at a particular range location. In other words, $\phi_{DP}$ is equal to ($\phi_H-\phi_V$). Practically though, the value of the measured $\phi_{DP}$ will be offset by the system's differential phase ($\phi_{DP\_System}$) leading to the following equation:

$$\phi_{DP}=(\phi_H-\phi_V)+\phi_{DP\_System}. \text{ [in degrees]}$$

In the case of an oblate target, the phase speed of the horizontally polarized waveform is slowed relative to that of the vertically polarized waveform during interaction leading to a positive ($\phi_H-\phi_V$). In this case, the measured differential phase angle would be greater than $\phi_{DP\_System}$. However, in the case of a spherical target, the phase speed of the horizontally polarized waveform is equal to that of the vertically polarized waveform during interaction leading to a zero value for the differential phase ($\phi_H-\phi_V$). The measured differential phase angle in this case would be exactly equal to $\phi_{DP\_System}$. It can be observed that in the case where the measured differential phase angle is exactly equal to $\phi_{DP\_System}$, the measured $Z_{DR}$ would be equal to $Z_{DR\_System}$. Thus, as will be described in more detail below, measurements having phase shifts satisfying the condition that $\phi_{DP}$ is approximately equal to $\phi_{DP\_System}$ are identified for use in calibrating the radar system 20, and for such measurements, the measured $Z_{DR}$ is approximately equal to $Z_{DR\_System}$. Thus, $Z_{DR\_System}$ is quantified using the identified measurements, and $Z_{DR\_System}$ is then used for calibration.

FIG. 1 depicts an exemplary embodiment of a dual polarization radar system 20. As shown by FIG. 1, the system 20 comprises a transmitter 22 that provides pulses to be wirelessly transmitted from an antenna 25. Each pulse is transmitted by power dividing circuitry 28 that divides the power, thereby providing for each pulse a horizontally polarized waveform and a vertically polarized waveform, both of which are transmitted simultaneously by the antenna 25. When the antenna 25 is able to transmit in dual polarization configuration, it is used for simultaneous transmission, and the power dividing circuitry 28 divides the input power received from the transmitter 22 by a factor of two (2) or any desired ratio thereby providing to the antenna power for the horizontally polarized and vertically polarized waveforms. Note that polarization refers to the locus of the tip of the electric field vector observed in a plane orthogonal to the wave normal.

Figure 2:
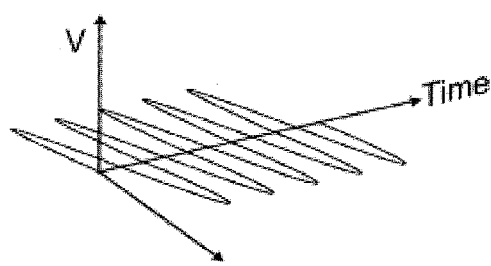
FIG. 2 depicts a graph of electric field versus time for a horizontally polarized waveform transmitted by an antenna of a dual polarization radar system, such as is depicted by FIG. 1.
Figure 3:
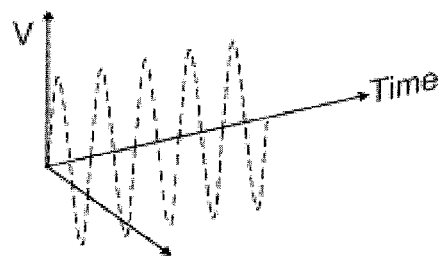
FIG. 3 depicts a graph of electric field versus time for a vertically polarized waveform transmitted by an antenna of a dual polarization radar system, such as is depicted by FIG. 1.
Figure 4A:
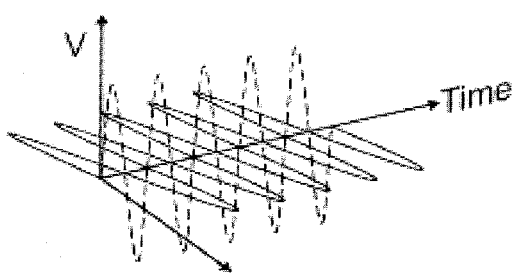
FIG. 4A depicts a graph of electric field versus time for both a vertically polarized waveform and a horizontally polarized waveform transmitted simultaneously by an antenna of a dual polarization radar system, such as is depicted by FIG. 1.

FIG. 2 depicts a graph of electric field versus time for a horizontally polarized waveform transmitted by the antenna 25, and FIG. 3 depicts a graph of electric field versus time for a vertically polarized waveform transmitted by the antenna 25. FIG. 4A depicts a graph of electric field versus time for both the vertically polarized waveform and the horizontally polarized waveform transmitted simultaneously.

In one embodiment, the antenna 25 of the dual polarization radar system 20 is a dual-polarization antenna capable of transmitting a single polarization. In such an embodiment, the antenna 25 alternates transmission of horizontally polarized waveforms and vertically polarized waveforms, and the horizontally polarized waveforms and vertically polarized waveforms are not transmitted simultaneously.

Figure 4B:
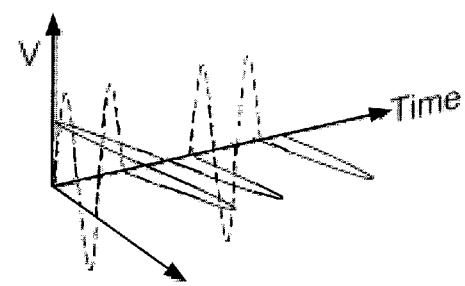
FIG. 4B depicts a graph of electric field versus time depicting alternately transmitting a vertically polarized waveform and a horizontally polarized waveform by an antenna of a dual polarization radar system, such as is depicted by FIG. 1.

When the antenna 25 is used for alternating transmission, the power dividing circuitry 28 does not divide the input power received from the transmitter 22. Instead, the power dividing circuitry provides available power for the horizontally polarized waveform and available power for the vertically polarized waveform. In such an embodiment, the transmitter 22 provides power to the power dividing circuitry 28, which the power dividing circuitry 28 provides to the antenna 25, similar to the embodiment described hereinabove, except that all available power is provided for the horizontally polarized waveform and then all available power is provided for the vertically polarized waveform. However, in such an embodiment, the antenna 25 transmits the horizontally polarized waveform and the vertically polarized waveform one after the other, alternating between them, for each pulse. FIG. 4B depicts a graph of electric field versus time for both the horizontally polarized waveform and the vertically polarized waveform transmitted when the antenna 25 alternates transmission one after the other.

Ideally, the vertically polarized waveform and the horizontally polarized waveform are transmitted at the same power and thus have the same amplitude. However, practically, there is a slight difference in transmit power causing a slight difference in amplitude, which results in a differential reflectivity bias introduced by the transmit section of the radar system.

Whether through simultaneous transmission or alternating transmission, for each pulse, energy from the vertically polarized waveform and the horizontally polarized waveform propagates from the antenna 25, reflects from objects, such as terrain, buildings, aerial vehicles, and meteorological scatterers (e.g., rain, hail, sleet, or snow), and returns to the antenna 25. Practically, there is a slight difference in the antenna's directional amplification ability along both the polarizations which results in a differential reflectivity bias introduced by the antenna section of the radar system.

A receiver 33 is configured to measure the reflections received by the antenna 25 and to amplify an analog signal indicative of the reflected energy from the vertically polarized waveform and an analog signal indicative of the reflected energy from the horizontally polarized waveform. Practically, there is a slight difference in the receiver amplification chain of components along both the polarizations which results in a differential reflectivity bias introduced by the receive section of the radar system. An intermediate frequency (IF) digitizer 36 is configured to convert each of the analog signals to digital signals, which are received by a signal processing element 41.

In simultaneous transmission, the horizontally polarized and vertically polarized waveforms strike the object at substantially the same time. Thus, the receiver 33 receives and measures the reflections of the horizontally polarized and vertically polarized waveforms at the same time upon receipt.

In alternating transmission, the horizontally polarized and vertically polarized waveforms do not strike the object at substantially the same time. Thus, when receiving reflections from the horizontally polarized waveform, the receiver 33 will receive still receive reflections from both horizontally polarized and vertically polarized signals; however, the time of receipt of the reflections will be offset in time because the horizontally polarized and vertically polarized waveforms were transmitted one after the other.

The signal processing element 41 is configured to store data 45, referred to herein as "raw measurement data," into memory 49, such as a database or other form of memory. In one exemplary embodiment, the data is separated into bins in which each bin corresponds to a specific geographic region along a particular azimuth and elevation within the range of the system 20, as will be described in more detail below. Note that the signal processing element 41 may be implemented in software, firmware, hardware, or any combination thereof.

FIG. 5 depicts an exemplary set of raw measurement data 45 for a plurality of bins. As shown by FIG. 5, each bin is associated with a particular azimuth angle (AA) and elevation angle (EA) of the antenna 25. In this regard, the antenna 25 is rotatable in a horizontal direction, which is indicated by the azimuth angle, and the antenna 25 is rotatable in a vertical direction, which is indicated by the elevation angle. The elevation angle and the azimuth angle of the antenna 25 for a particular bin define the direction that the antenna 25 is pointed and, hence, the direction of propagation of the vertically polarized waveform and the horizontally polarized waveform when the measurement for the bin was taken. Further, each bin is also associated with a different time period relative to the time of transmission of the measured vertically and horizontally polarized waveforms from the antenna 25.

As an example, the first five bins (bins 1-5) of FIG. 5 indicate measurements for a particular pulse while the antenna 25 is oriented, at the same azimuth angle $AA_1$ and elevation angle $EA_1$. Each such bin 1-5 represents a sample of the pulse at a different time period and thus represents the reflectivity for a different geographic region relative to the other bins. In this regard, assume that a sample for bin 1 occurs a time ($t_1$) after the transmission of a pulse for the sample. The vertical reflectivity ($Z_V$) and horizontal reflectivity ($Z_H$) measured at time $t_1$ are based on returns of the vertically polarized waveform and the horizontally polarized waveform, respectively, from objects within a geographic region that is about a distance $d_1$ from the antenna 25 in the direction indicated by $AA_1$ and $EA_1$, where $d_1$ corresponds to the following equation: $d_1 = (v \times t_1)/2$, where v is the speed of the vertically and horizontally polarized waveforms through the atmosphere. Note that the values in each bin may be averaged over multiple samples to provide results that are statistically more accurate.

When alternating transmission is employed by the antenna 25, the measurements taken, as depicted in FIG. 5 are substantially identical. However, as noted hereinabove, when alternating transmission is used, the reflections received and measured by the receiver 33 (FIG. 1) corresponding to a horizontally polarized waveform are received at a different time than a vertically polarized waveform, i.e., the waveforms are not transmitted simultaneously, thus they are not reflected simultaneously. Thus, the receiver 33 measures the reflected power in the horizontally polarized waveform ($Z_H$) and the reflected power in the vertically polarized waveform ($Z_V$) following receipt of the reflections corresponding to the horizontally polarized waveform. In effect, for an alternating transmission, $Z_H$ and $Z_V$ are measured during different time periods.

Notably, in alternating transmission, the antenna 25 (FIG. 1) transmits a horizontally polarized waveform, and the receiver 33 receives horizontally polarized reflections and vertically polarized reflections. Also, in alternating transmission, the antenna 25 (FIG. 1) transmits a vertically polarized waveform, and the receiver 33 receives vertically polarized reflections and horizontally polarized reflections. In this regard, due to properties inherent in objects from which the waveforms are reflected, the objects may introduce different polarities in the reflections than the polarity of the waveform transmitted.

Considering the foregoing, there is a measureable phase angle shift between the horizontally transmitted waveform and the horizontally polarized reflections ($\phi_{HH}$). Further, there is a measureable phase angle shift between the vertically transmitted waveform and the vertically polarized reflections ($\phi_{VV}$). Thus, the differential phase shift $\phi_{DP\_System}$ may be calculated as indicated hereinabove as ($\phi_{HH}-\phi_{VV}$).

Further, horizontal reflectivity ($Z_H$) is the power of the horizontally polarized reflections, and the vertical reflectivity ($Z_V$) is the power of the vertically polarized reflections, i.e., those reflections received by the receiver. Therefore, differential reflectivity for the system ($Z_{DR}$_system) may be determined for the alternating transmission scenario in order to calibrate the system.

The concept of defining bins of data indicative of measured reflectivity for different geographic regions is generally well-known and will not be described in much greater detail herein. In addition, the parameters shown by FIG. 5 are exemplary, and the raw measurement data 45 may include other types of parameters not specifically disclosed herein. Note that exemplary dual polarization radar systems are described in commonly-assigned U.S. Pat. No. 7,554,486, entitled "System and Method for Dual Polarization Radar with Automatic Built-In Test Equipment and Calibration," and issued on Jun. 30, 2009, which is incorporated herein by reference.

A control processing element 52 is configured to analyze and process the raw measurement data 45 to provide data 55, referred to hereafter as "corrected measurement data," that is free of artifacts unrelated to weather, such as ground clutter. Note that the control processing element 52 may be implemented in hardware, software, firmware, or any combination thereof. In an exemplary embodiment illustrated in FIG. 6, the control processing element 52 is implemented in software and stored in memory 63 of a computer system 66.

The control processing element 52, when implemented in software, can be stored and transported on any computer-readable medium for use by or in connection with an instruction execution apparatus that can fetch and execute instructions. In the context of this document, a "computer-readable medium" can be any means that can contain or store a program for use by or in connection with an instruction execution apparatus.

Figure 6:
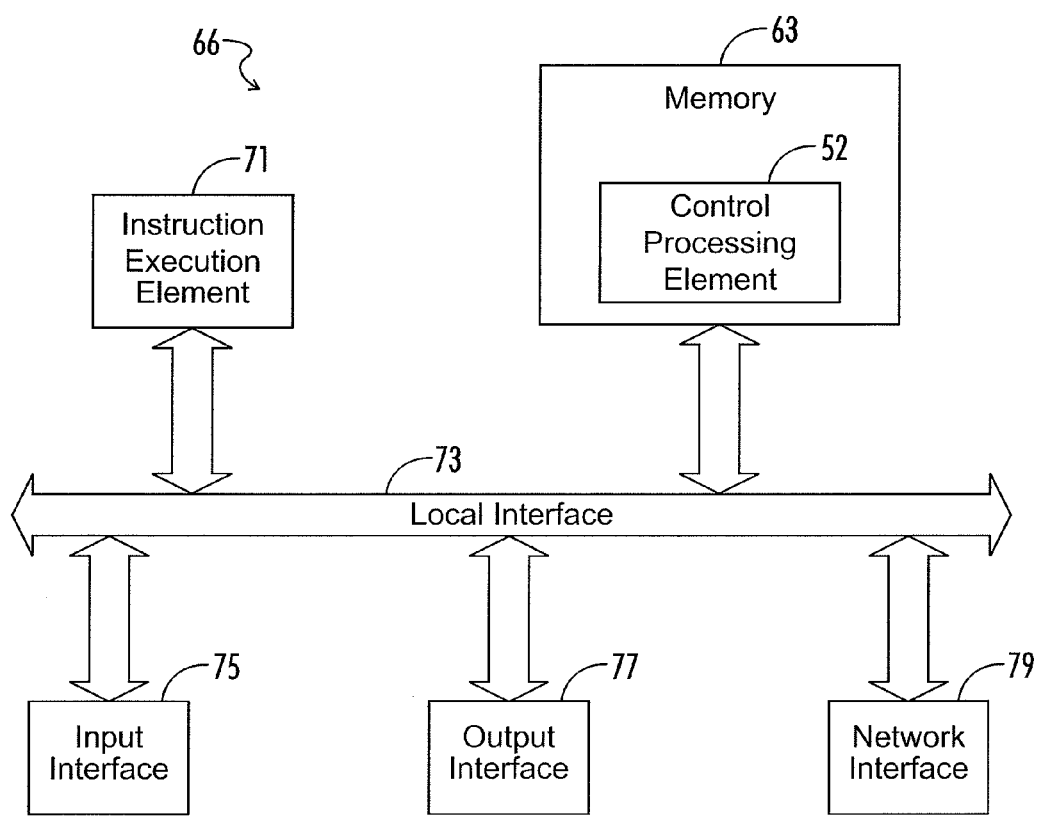
FIG. 6 is a block diagram illustrating an exemplary embodiment of computer system for implementing a signal processing element, such as is depicted by FIG. 1.

The exemplary embodiment of the computer system 66 depicted by FIG. 6 comprises at least one conventional instruction execution apparatus 71, such as a digital signal processor (DSP) or a central processing unit (CPU), that communicates to and drives the other elements within the system 66 via a local interface 73, which can include at least one bus. Furthermore, an input interface 75, for example, a keyboard, keypad, or a mouse, can be used to input data from a user of the system 66, and an output interface 77, for example, a printer or a display device, e.g., a liquid crystal display (LCD), can be used to output data to the user. In addition, a network interface 79, such as a modem, may be used to exchange data with a network (not shown).

To provide the corrected measurement data 45, the control processing element 52 uses various known algorithms to analyze the raw measurement data 45 to determine which bins pertain to returns from objects unrelated to weather, such as buildings, terrain, aerial vehicles, etc. The control processing element 52 filters the raw measurement data 45 to remove the bins determined to be associated with returns from objects unrelated to weather such that the corrected measurement data 55 does not include such bins.

The control processing element 52 is also configured to calculate various parameters that are useful for determining and describing weather events indicated by the corrected and raw measurement data 55 and 45. As an example, for each bin indicated by the corrected measurement data 55, the control processing element 52 calculates differential reflectivity ($Z_{DR\_Corrected}$) according to the equation:

$$Z_{DR\_Corrected} = Z_{DR\_Measured} - Z_{DR\_System},$$

where $Z_{DR\_System}$) as described above, represents the system's differential reflectivity determined via the calibration process described in more detail below. Subtracting $Z_{DR\_System}$ from the measured differential reflectivity $Z_{DR\_Measured}$ effectively removes the differential reflectivity of the system 20 such that $Z_{DR\_Corrected}$ is substantially free of the system's differential reflectivity. That is, $Z_{DR\_Corrected}$ has been calibrated to remove the differential reflectivity introduced by the system 20. The corrected differential reflectivity value ($Z_{DR\_Corrected}$) can be analyzed (e.g., compared to thresholds) to determine the type of meteorological scatterer indicated by the returns for the bin being analyzed. As an example, if $Z_{DR\_Corrected}$ falls within one threshold range, then rain might be indicated, but if $Z_{DR\_Corrected}$ falls in another threshold range, snow might be indicated. Analyzing the corrected measurement data 55 to determine weather information is generally well-known and will not be described in much greater detail herein.

The control processing element 52 is configured to format and otherwise modify the corrected measurement data 55 to provide data 84, referred to hereafter as "weather data," that is compatible with a design generator 88. The weather data 84 is indicative of weather events within the range of the radar system 20. As an example, the weather data 55 may indicate geographic regions affected by rain, hail, snow, sleet, lightning, winds, and other types of weather events, and the weather data 55 may also quantify the extent to which the geographic regions are affected by such events.

The design generator 88 is configured to use the weather data 84 to provide the data 84 in a user-friendly form for display via an output interface 93, such as a printer or a display device. As an example, the design generator 88 may use the weather data 84 to display a radar map that can be viewed to determine the types of weather events occurring within a given geographic region within the vicinity of the radar system 20.

As shown by FIG. 1, the weather data 84 is stored in memory 99, which may be remote from the control processing element 52. As an example, the weather data 99 may be transmitted via a network (not shown) to a central location that collects weather data from multiple radar systems to provide weather information pertaining to a much wider geographic region than what is indicated by the raw measurement data 45.

The control processing element 52 is configured to analyze the raw measurement data 45 and identify which bins are indicative of returns from spherical objects. The control processing element 52 then uses the identified bins to determine $Z_{DR\_system}$ that is used for calibration. Specifically, for each identified bin, it is assumed that any difference between the measured $Z_H$ and $Z_V$ is attributable to the system's differential reflectivity error, and the control processing element 52 calculates $Z_{DR\_System}$ by subtracting the measured $Z_H$ and $Z_V$. The control processing element 52 then creates a histogram of $Z_{DR\_Measured}$ for each of the identified bins; the peak of which will correspond to the system differential reflectivity value ($Z_{DR\_System}$) to be used for calibration. As described above, this system differential reflectivity value is subtracted from each differential reflectivity measurement of the corrected measurement data 55 in order to calibrate the differential reflectivity measurements to make them representative of the weather in the radar's field of view. Specifically, for each bin of the corrected measurement data 55, the control processing element 52 subtracts $Z_{DR\_system}$ from the difference of $Z_H$ and $Z_V$ indicated by the bin in order to remove the estimated system differential reflectivity from the differential reflectivity calculation.

There are various techniques that can be used to identify which of the bins indicate returns from spherical objects. An exemplary process for identifying such bins will be described in more detail below, but it should be emphasized that various changes and modifications to the described process would be apparent to a person of ordinary skill upon reading this disclosure.

Figure 7:
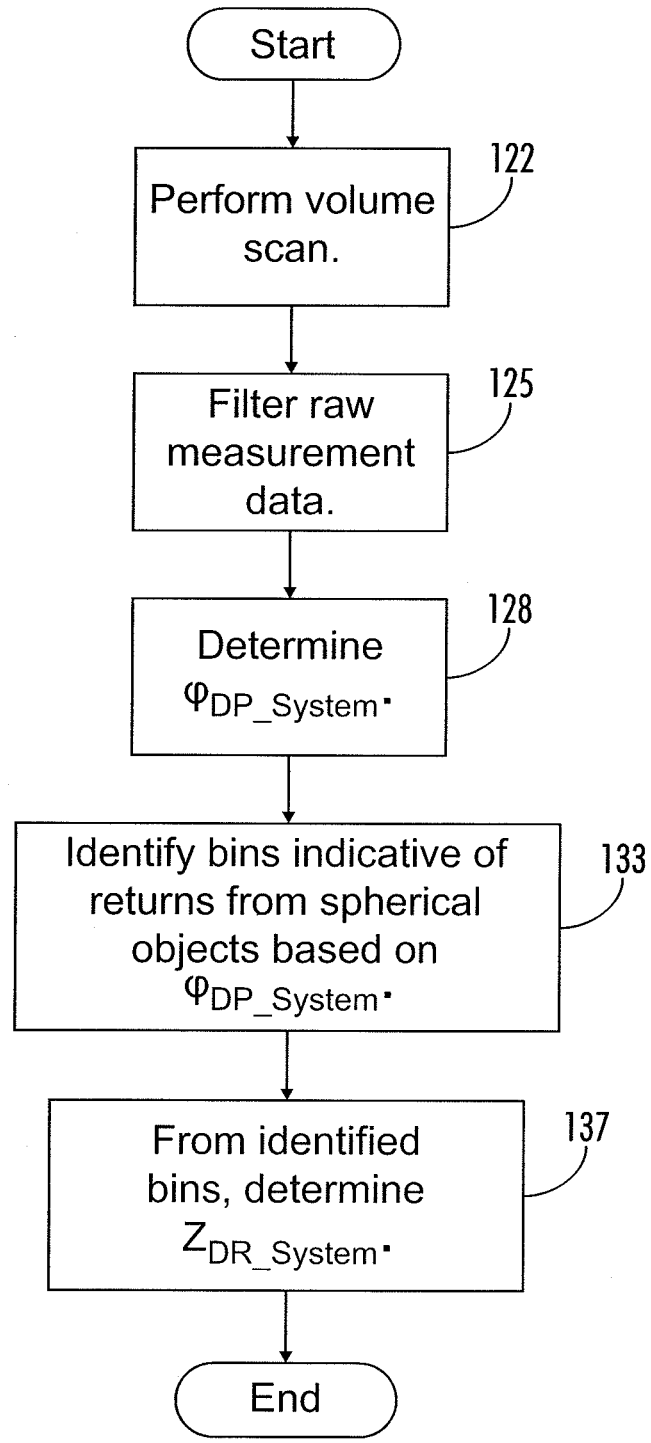
FIG. 7 is a flow chart illustrating an exemplary method for determining a system differential reflectivity value to be used for compensating for system error in a dual polarization radar system, such as is depicted by FIG. 1.

Initially, the radar system 20 performs a volume scan to generate a set of raw measurement data 45, as shown by block 122 of FIG. 7. That is, the radar system 20 collects raw measurement data 45 while the antenna 25 rotates across a range of 360 degrees at a specific elevation angle (e.g., 0.5 degrees). To improve the accuracy of the calibration process, the control processing element 52 filters the raw measurement data 45 to remove bins that are likely erroneous, as shown by block 125 of FIG. 7. In one exemplary embodiment, the control processing element 52 removes bins indicative of returns having a signal-to-noise ratio (SNR) below a threshold, such as 20 decibels (dB). In other embodiments, other techniques for determining which bins to remove are possible.

The control processing element 52 then analyzes the filtered raw measurement data 45 to determine the system differential phase angle ($\phi_{DP\_System}$), as shown by block 128 of FIG. 7. The system differential phase angle refers to the two-way phase angle difference between the horizontally polarized waveform and the vertically polarized waveform. That is, the system differential phase is equal to the difference between the two-way phase angle ($\phi_H$) of the horizontally polarized waveform and the two-way phase angle ($\phi_V$) of the vertically polarized waveform or, in other words, ($\phi_H-\phi_V$). Note as described hereinabove, if the antenna 25 is employing alternating transmission, the system differential phase is equal to the difference between the two-way phase angle ($\phi_{HH}$) of the horizontally polarized waveform and the two-way phase angle ($\phi_{VV}$) of the vertically polarized waveform. In one exemplary embodiment, techniques described by Zrnic D. S., Melnikov V. M., and Ryzhkov A. V., "Correlation Coefficients between Horizontally and Vertically Polarized Returns," 2005, are used to determine $\phi_{DP\_System}$. In this regard, the control processing element 52 determines the system differential phase angle by plotting a histogram of the differential phase angle values and the peak value of which corresponds to the system differential phase angle ($\phi_{DP\_System}$).

Figure 8:
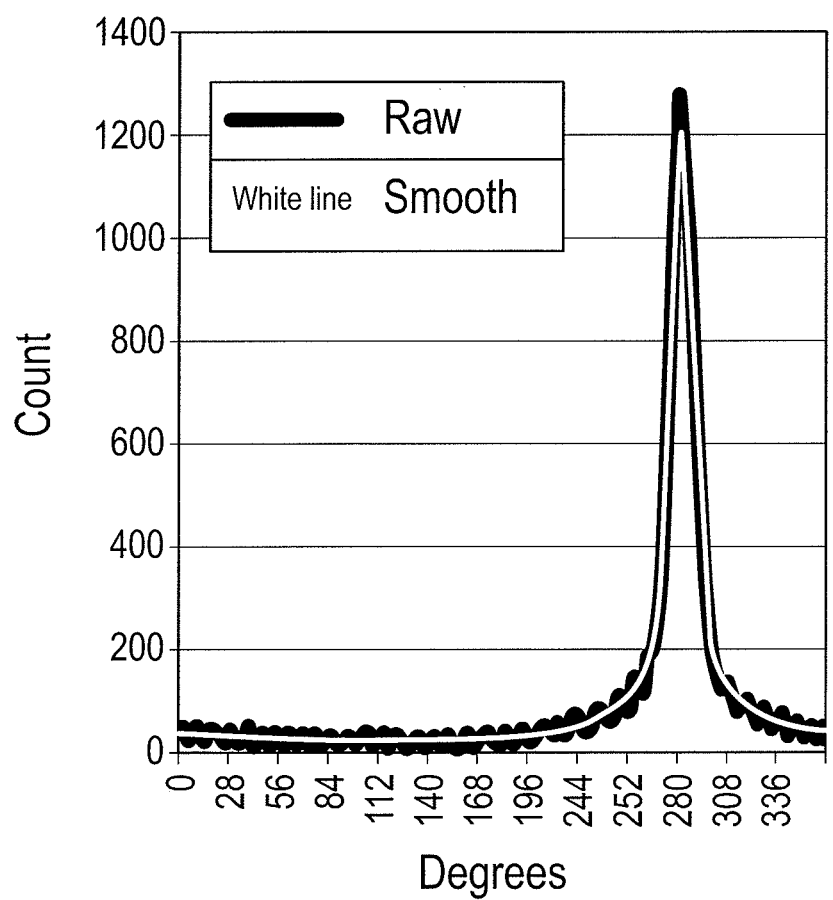
FIG. 8 depicts an exemplary histogram of differential phase values measured by a dual polarization radar system, such as is depicted by FIG. 1.

In this regard, for each bin in the filtered raw measurement data 45, the signal processing element 41 would have determined the bin's differential phase angle value by computing the arc-tangent of the cross-correlation between the horizontally and vertically polarized returns. The control processing element 52 then defines a histogram by plotting, for each differential phase angle value, the number of bins ("count") having such differential phase angle value and smoothing the curve indicated by the plot. An exemplary histogram of the differential phase values is shown by FIG. 8. In the exemplary plot shown by FIG. 8, the peak of the curve occurs at about 280 degrees. Such peak differential phase angle value is the system differential phase angle value ($\phi_{DP\_System}$).

After determining the system differential phase angle, the control processing element 52 again filters the raw measurement data 45, based on $\phi_{DP\_System}$, to identify bins indicative of returns from spherical objects, as shown by block 133 of FIG. 7. As part of the filtering process for one exemplary embodiment, the control processing element 52 identifies bins meeting the following three conditions, referred to hereafter as "filtering conditions": (1) a measured differential phase angle value ($\phi_H-\phi_V$) equal to $\phi_{DP\_System}$; (2) a cross-correlation coefficient at any time lag, $\rho_{HV}$ greater than or equal to a predefined threshold, such as 0.8; and (3) a measured specific differential phase, $K_{DP}$, equal to 0. In other embodiments, other filtering conditions may be specified.

Figure 9:
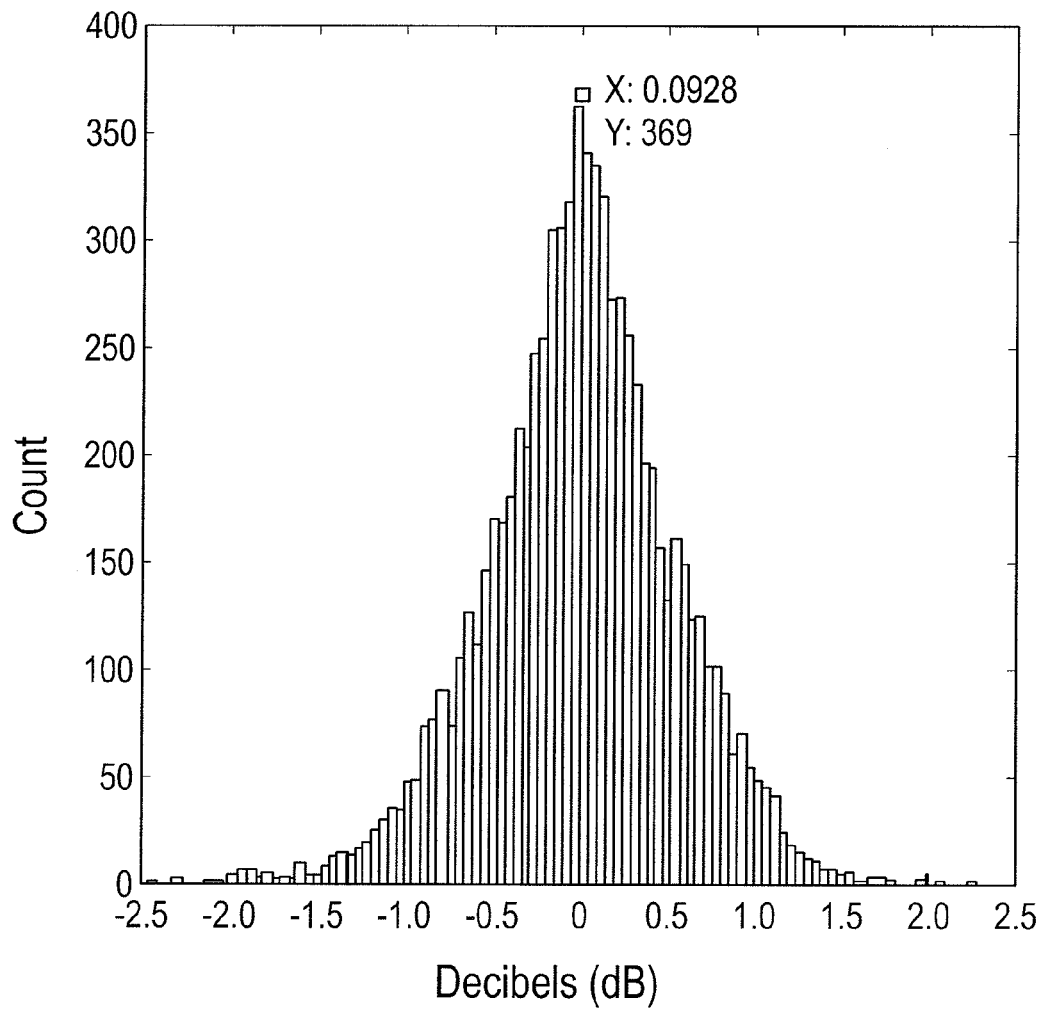
FIG. 9 depicts an exemplary histogram of differential reflectivity values measured by a dual polarization radar system, such as is depicted by FIG. 1.

After identifying the bins indicative of returns from spherical objects for the calibration process, the control processing element 52 determines the system differential reflectivity ($Z_{DR\_system}$) by plotting a histogram of the differential reflectivity values of the identified bins and then selecting the peak value of the histogram to be the system differential reflectivity value ($Z_{DR\_System}$). An exemplary histogram of the differential reflectivity values is shown by FIG. 9. In the exemplary plot shown by FIG. 9, the peak of the curve occurs at about 0.0928. Such peak differential reflectivity value is the system differential reflectivity value ($Z_{DR\_System}$). The corrected measurement data 55 is then calibrated by subtracting the selected system differential reflectivity value ($Z_{DR\_System}$) from the differential reflectivity measurement $Z_{DR\_Measured}$ for each bin. Accordingly, when the corrected measurement data 55 is used to provide the weather data 84, the weather data 84 is likely to more accurately indicate the weather events in the vicinity of the radar system 20.

As described hereinabove, $L_{DR}$ may be measured in order to obtain data regarding weather artifacts, and in such a system 20 alternating transmission would be used. Thus, the system 20 may further use real-time measurements to calculate LDR_system in order to account for any system error that may occur in receiving channels of the receiver 33. Because there are two receiving channels, two parameters LDRH_system and LDRV_system are calculated and used in LDR_actual calculations in order to ensure that the receiver 33 does not introduce error into the final determinations relating to artifacts. In alternating transmission, the antenna 25 transmits a polarized waveform of one polarization followed by a waveform of a different polarization. In such a scenario, the antenna 25 transmits the waveform having one polarization during a given period, and at a period of time following transmits the waveform having a different polarization. In an exemplary scenario, the first waveform transmitted is horizontally polarized, and the second waveform transmitted is vertically polarized, i.e., alternating transmission. Further, the receiver 33 is configured with two channels for receiving horizontally polarized and vertically polarized reflections.

When a horizontally polarized waveform is transmitted by the antenna 25 and strikes an object, some of the reflected waveform remains horizontally polarized; however some of the horizontally polarized waveform becomes vertically polarized. The $L_{DRH}$ is the ratio of the power received resulting from horizontally polarized reflections and the power received resulting from vertically polarized reflections, and is represented by the following equation:

$$L_{DRH}=10\log_{10}(Z_{VH}/Z_{HH}) \text{ dB},$$

where $Z_{VH}$ is a power measurement resulting from the vertically polarized reflections, and $Z_{HH}$ is a power measurement resulting from the horizontally polarized reflections, both resulting from the transmitted horizontally polarized waveform.

When a vertically polarized waveform is transmitted by the antenna 25 and strikes an object, some of the reflected waveform remains vertically polarized; however some of the vertically polarized waveform becomes horizontally polarized. The $L_{DRV}$ is the ratio of the power received resulting from vertically polarized reflections and the power received resulting from horizontally polarized reflections, and is represented by the following equation:

$$L_{DRV}=10\log_{10}(Z_{HV}/Z_{VV}) \text{ dB},$$

where $Z_{VV}$ is a power measurement resulting from the vertically polarized reflections, and $Z_{HV}$ is a power measurement resulting from the horizontally polarized reflections, both resulting from the transmitted vertically polarized waveform. For alternating transmission systems, any measured $L_{DR}$ indicated by the identified measurements derived while striking spherical targets is attributable to the system's linear depolarization ratio ($L_{DR\_System}$). In this regard, for an actual $L_{DR}$ measurement, the measured linear depolarization ratio ($L_{DR}$) can be expressed according to the following equation:

$$L_{DR\_Actual}=(L_{DR\_measured})-L_{DR\_System}.$$

For a perfectly spherical target, $L_{DRH}$ and $L_{DRV}$ should both be equal to zero such that the $L_{DR\_Actual}$ is equal to $L_{DR\_System}$. This radar system induced bias ($L_{DR\_System}$) should be corrected for in order to provide accurate weather data.

Additionally, the phase differential may further be used for calibration purposes. In this regard, when the antenna 25 transmits a horizontally polarized waveform, the phase shift between the received horizontal and vertically polarized returns is determined by calculating a difference between the measured phase of the horizontally polarized reflections and the measured phase of the vertically polarized reflections, and is represented by the following equation:

$$\phi_{H\_system}=\phi_{VH}-\phi_{HH},$$

where $\phi_{VH}$ is the measured phase resulting from the vertically polarized reflections, and $\phi_{HH}$ is the measured phase resulting from the horizontally polarized reflections, both resulting from the transmitted horizontally polarized waveform.

Further, when the antenna 25 transmits a vertically polarized waveform, the phase shift between the received horizontal and vertically polarized returns is determined by calculating a difference between the measured phase of the vertically polarized reflections and the measured phase of the horizontally polarized reflections, and is represented by the following equation:

$$\Phi_{V\_system}=\phi_{HV}-\phi_{VV},$$

where $\phi_{HV}$ is the measured phase resulting from the horizontally polarized reflections, and $\phi_{VV}$ is the measured phase resulting from the vertically polarized reflections, both resulting from the transmitted vertically polarized waveform.

Thus, in the alternating transmission embodiment of the system 20, when the antenna 25 transmits only a horizontally polarized waveform, $Z_{HH}$ is measured and $L_{DRH}$ is calculated. Further, when the antenna 25 transmits only a vertically polarized waveform, $Z_{VV}$ is measured and $L_{DRV}$ is calculated. For purposes of employing calibration as described hereinabove, $Z_{DR}$ is computed based upon the measured $Z_{HH}$ and $Z_{VV}$. In this regard, the following equation is used:

$$Z_{DR}=(Z_{HH}-Z_{VV})+Z_{DR\_System}. \text{ [in dB]}$$

For a perfectly spherical target, $(Z_{HH}-Z_{VV})$ should be equal to zero such that the measured $Z_{DR}$ should be equal to $Z_{DR\_System}$. The system induced bias ($Z_{DR\_System}$) may then be used in calibration as described hereinbove.

FIG. 10 depicts exemplary raw measurement data 1000 collected by a horizontal channel of a dual polarization radar system using alternating transmission and $L_{DR}$ measurements to identify artifacts. Such raw measurement data 1000 is similar to data 45 depicted in FIG. 5. The first five bins (bins 1-5) of FIG. 5 indicate horizontal channel measurements for a particular pulse while the antenna 25 is oriented at the same azimuth angle $AA_1$ and elevation angle $EA_1$. Each such bin 1-5 represents a sample of the pulse at a different time period and thus represents the reflectivity for a different geographic region relative to the other bins. In this regard, assume that a sample for bin 1 occurs a time ($t_1$) after the transmission of a pulse for the sample. The horizontal channel measured horizontal reflectivity ($Z_{HH}$) and vertical channel measured horizontal reflectivity ($Z_{VH}$) measured at time $t_1$ are based on returns of the horizontally polarized waveform from objects within a geographic region that is about a distance $d_1$ from the antenna 25 in the direction indicated by $AA_1$ and $EA_1$, where $d_1$ corresponds to the following equation:

$$d_1=(v \times t_1)/2,$$

where v is the speed of the vertically and horizontally polarized waveforms through the atmosphere. Note that the values in each bin may be averaged over multiple samples to provide results that are statistically more accurate. Such collected data is used to calculate system calibration values for $L_{DRH\_system}$ so that actual measured $L_{DRH}$ values may be modified with the $L_{DRH\_system}$ to account for error introduced by the system.

Figure 11:
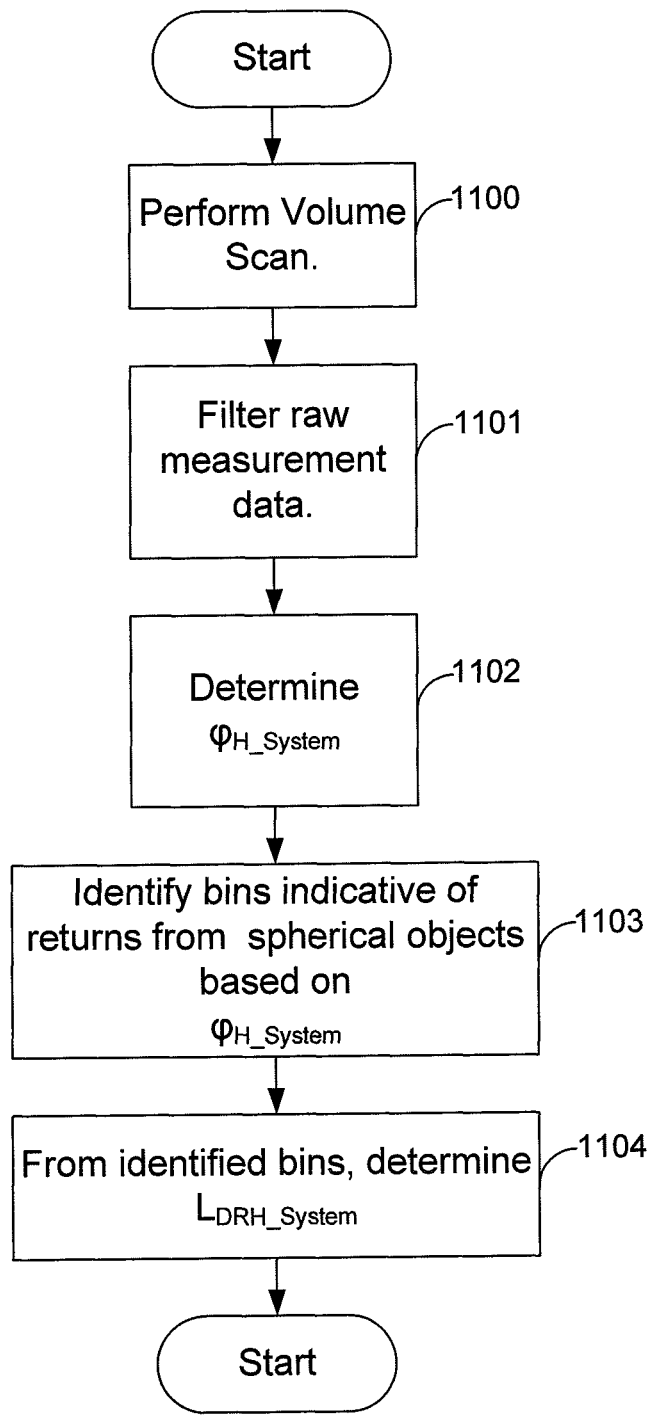
FIG. 11 is a flow chart illustrating an exemplary method for determining a system differential reflectivity value to be used for compensating for system error in a horizontal channel of a dual polarization radar system, such as is depicted by FIG. 1.

FIG. 11 is a flowchart depicting architecture and functionality of the control processing element 52 for calculating a correction factor $L_{DRH\_system}$ during the transmission of a horizontally polarized pulse on a dual polarimetric system 20 using alternating transmission.

Initially, the radar system 20 performs a volume scan to generate a set of raw measurement data 45, as shown by block 1100 of FIG. 11. That is, the radar system 20 collects raw measurement data 1000 while the antenna 25 rotates across a range of 360 degrees at a specific elevation angle (e.g., 0.5 degrees). To improve the accuracy of the calibration process, the control processing element 52 filters the raw measurement data 1100 to remove bins that are likely erroneous, as shown by block 1101 of FIG. 11. In one exemplary embodiment, the control processing element 52 removes bins indicative of returns having a signal-to-noise ratio (SNR) below a threshold, such as 20 decibels (dB). In other embodiments, other techniques for determining which bins to remove are possible.

The control processing element 52 then analyzes the filtered raw measurement data 100 to determine the system horizontal differential phase angle ($\phi_{H\_System}$), as shown by block 1102 of FIG. 11. The system differential phase angle refers to the two-way phase angle difference between the horizontally polarized reflections and the vertically polarized reflections. That is, the system differential phase angle is equal to the difference between the phase angle ($\phi_{VH}$) of the vertically polarized reflections and the phase angle ($\phi_{HH}$) of the horizontally polarized waveform or, in other words, ($\phi_{VH}-$ $\phi_{HH}$). In this regard, the control processing element 52 determines the system phase difference by plotting histogram of the differential phase angle values and the peak value of which corresponds to the system differential phase while transmitting a horizontal pulse only ($\phi_{H\_System}$).

Figure 12:
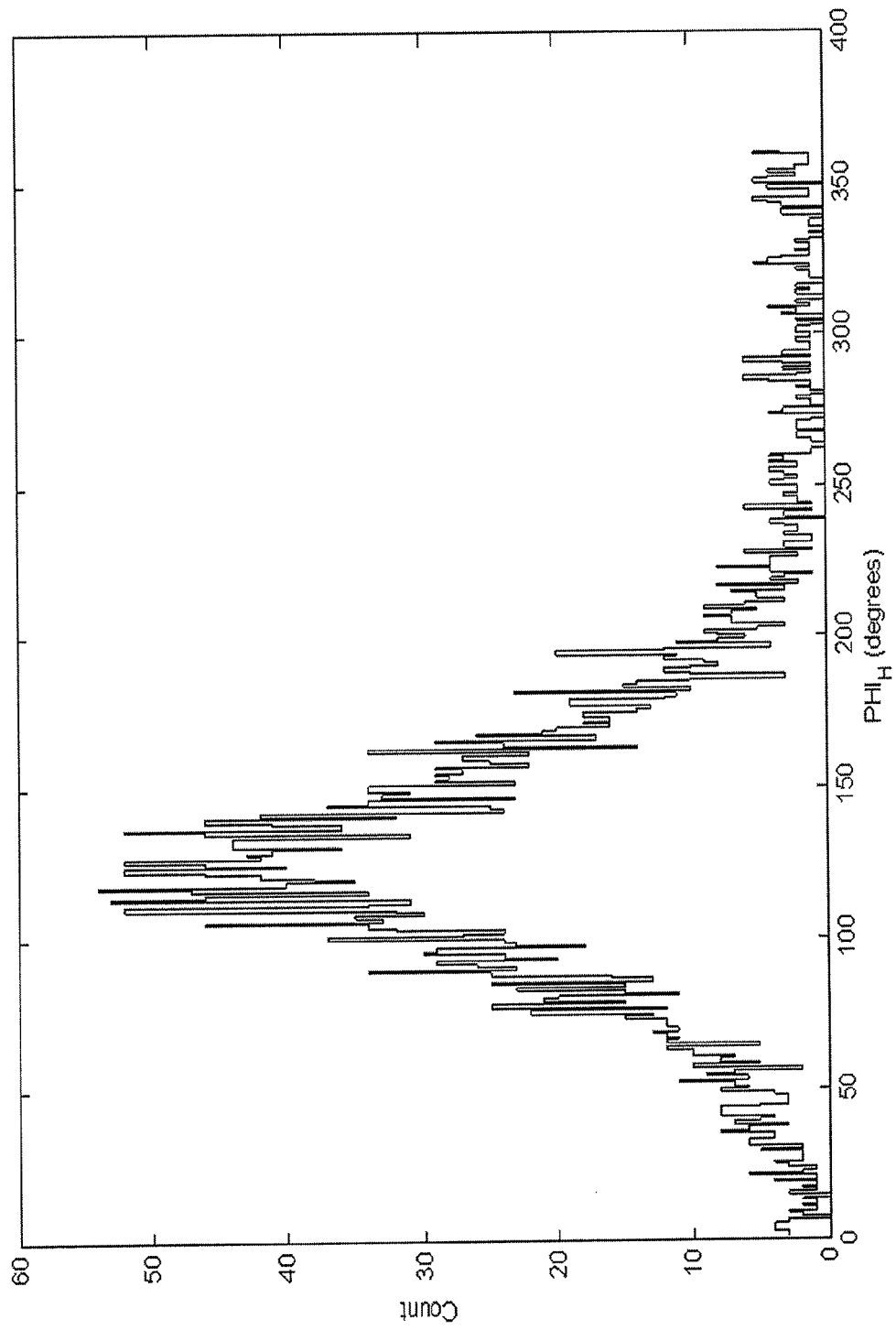
FIG. 12 depicts an exemplary histogram of differential phase values measured by a horizontal channel of a dual polarization radar system, such as is depicted by FIG. 1.

In this regard, for each bin in the filtered raw measurement data (e.g., data 1000), the signal processing element 41 determines the bin's differential phase angle value by computing the arc-tangent of the cross-correlation between the horizontally and vertically polarized returns. The control processing element 52 then defines a histogram by plotting, for each differential phase angle value, the number of bins ("count") having such differential phase angle value and smoothing the curve indicated by the plot. An exemplary histogram of the differential phase values is shown by FIG. 10. In the exemplary plot shown by FIG. 12, the peak of the curve occurs at about 125 degrees. Such peak differential phase angle value is the system differential phase angle value ($\phi_{H\_System}$) while transmitting a horizontal pulse only.

Figure 13:
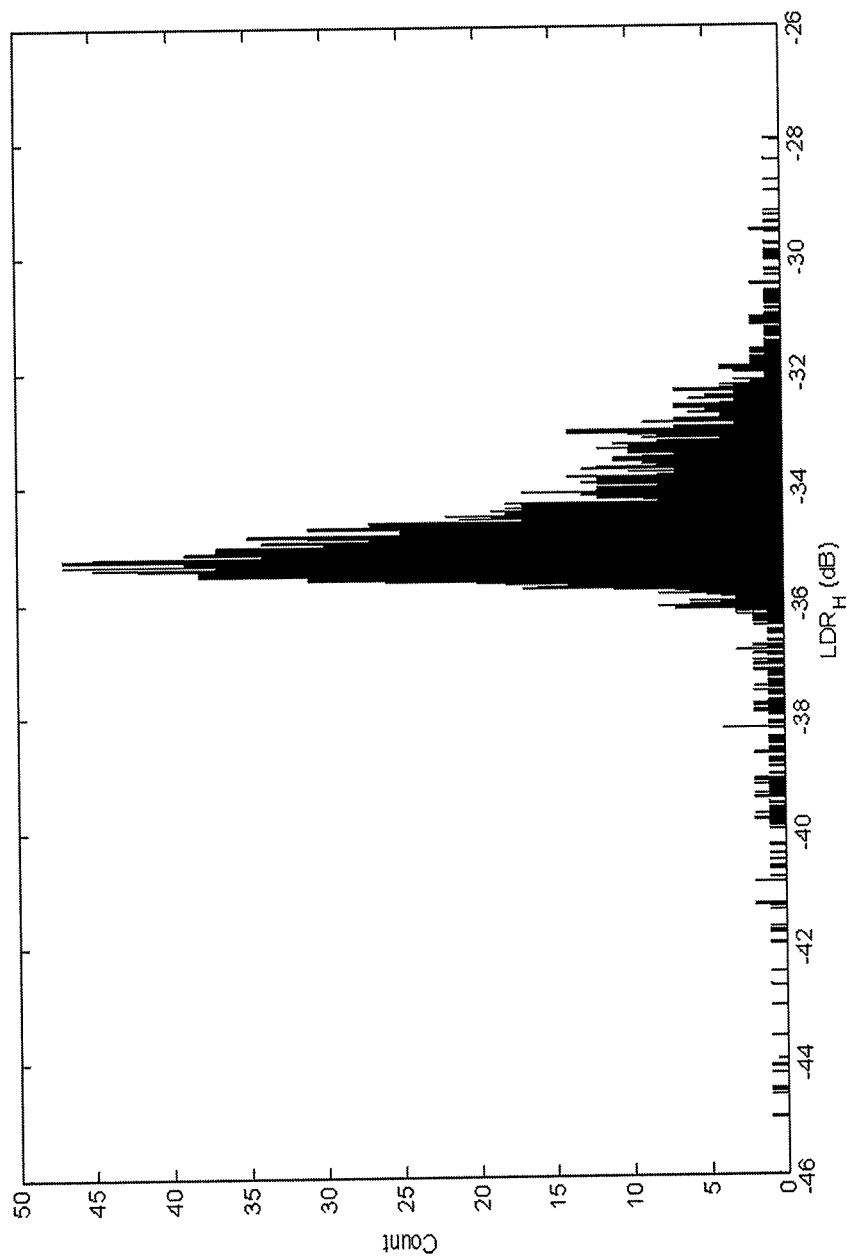
FIG. 13 depicts an exemplary histogram of differential reflectivity values measured by a horizontal channel of a dual polarization radar system, such as is depicted by FIG. 1.

After determining the system horizontal differential phase angle, the control processing element 52 again filters the raw measurement data, based on $\phi_{H\_System}$ to identify bins indicative of returns from spherical objects, as shown by block 1103 of FIG. 11. After identifying the bins indicative of returns from spherical objects for the calibration process, the control processing element 52 determines the system horizontal linear depolarization ratio ($L_{DRH\_System}$) by plotting a histogram of the linear depolarization ratio values of the identified bins and then selecting the peak value of the histogram to be the system linear depolarization ratio ($L_{DRH\_System}$). An exemplary histogram of the linear depolarization ratio values is shown by FIG. 13. In the exemplary plot shown by FIG. 13, the peak of the curve occurs at about −35 dB. Such peak linear depolarization ratio value is the system horizontal linear depolarization value ($L_{DRH\_System}$). The corrected measurement data 1000 is then calibrated by subtracting the selected system linear depolarization value ($L_{DRH\_System}$) from the measurement $L_{DR\_Measured}$ for each bin. Accordingly, when the corrected measurement data 1000 is used to provide the weather data 84, the weather data 84 is likely to more accurately indicate the weather events in the vicinity of the radar system 20.

FIG. 14 depicts exemplary raw measurement data 1500 collected by transmitting a vertically polarized pulse on a dual polarization radar system using alternating transmission and $L_{DR}$ measurements to identify artifacts. Such raw measurement data 1500 is similar to data 1000 depicted in FIG. 10, which is described herein. Note that horizontal channel measured horizontal reflectivity ($Z_{HV}$) and vertical channel measured vertical reflectivity ($Z_{VV}$) measured at time $t_1$ are based on returns of the vertical polarized waveform from objects within a geographic region. Such collected data is used to calculate system calibration values for $L_{DRV\_system}$ so that actual measured $L_{DRV}$ values may be modified with the $L_{DRV\_system}$ to account for error introduced by the system.

Figure 15:
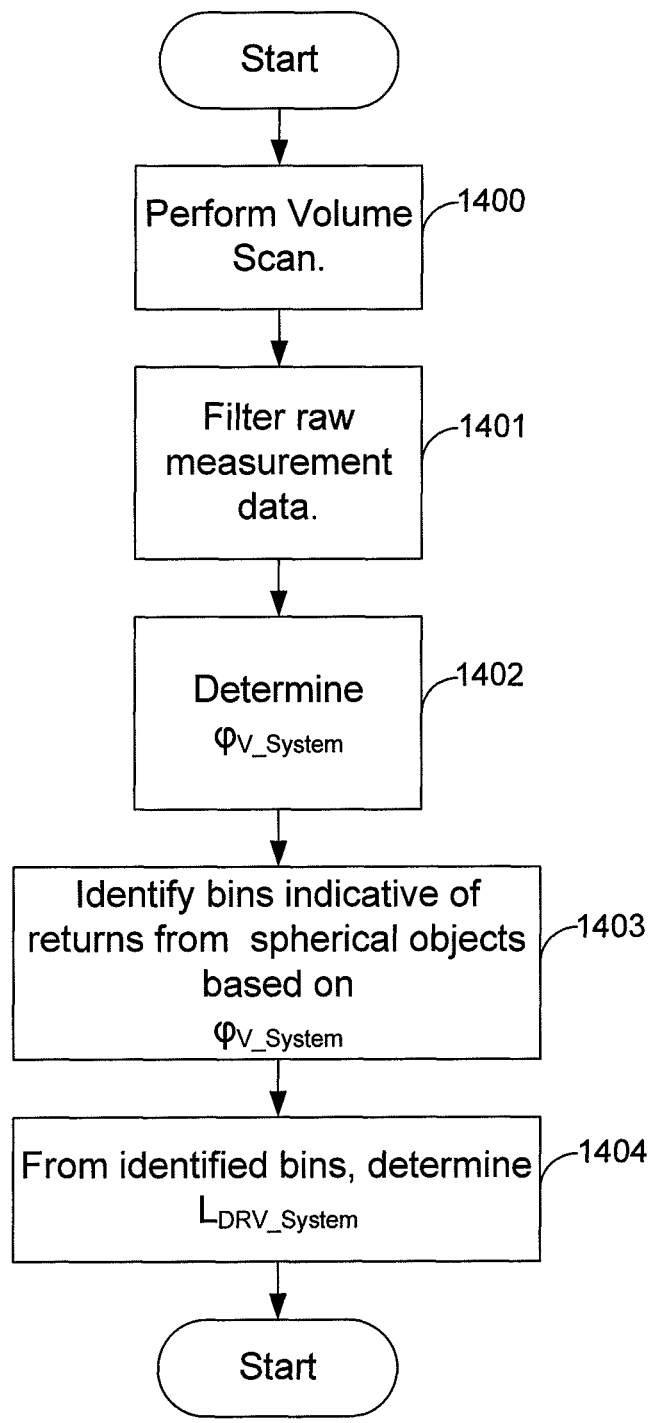
FIG. 15 is a flow chart illustrating an exemplary method for determining a system differential reflectivity value to be used for compensating for system error in a vertical channel of a dual polarization radar system, such as is depicted by FIG. 1.

FIG. 15 is a flowchart depicting architecture and functionality of the control processing element 52 for calculating a correction factor $L_{DRV\_system}$ during the transmission of a vertically polarized pulse on a dual polarimetric system 20 using alternating transmission.

Initially, the radar system 20 performs a volume scan to generate a set of raw measurement data 45, as shown by block 1400 of FIG. 15. That is, the radar system 20 collects raw measurement data 1400 while the antenna 25 rotates across a range of 360 degrees at a specific elevation angle (e.g., 0.5 degrees). To improve the accuracy of the calibration process, the control processing element 52 filters the raw measurement data 1100 to remove bins that are likely erroneous, as shown by block 1401 of FIG. 151. In one exemplary embodiment, the control processing element 52 removes bins indicative of returns having a signal-to-noise ratio (SNR) below a threshold, such as 20 decibels (dB). In other embodiments, other techniques for determining which bins to remove are possible.

The control processing element 52 then analyzes the filtered raw measurement data 1400 to determine the system differential phase angle ($\phi_{V\_System}$), as shown by block 1402 of FIG. 15. The system differential phase angle refers to the two-way phase angle difference between the horizontally polarized reflections and the vertically polarized reflections. That is, the system differential phase angle ($\phi_{V\_System}$) is equal to the difference between the phase angle ($\phi_{HV}$) of the horizontally polarized reflections and the phase angle ($\phi_{VV}$) of the vertically polarized reflections or, in other words, ($\phi_{HV}-\phi_{VV}$). In this regard, the control processing element 52 determines the system phase difference by plotting histogram of the differential phase angle values and the peak value of which corresponds to the system differential phase while transmitting a vertical pulse only ($\phi_{V\_System}$).

Figure 16:
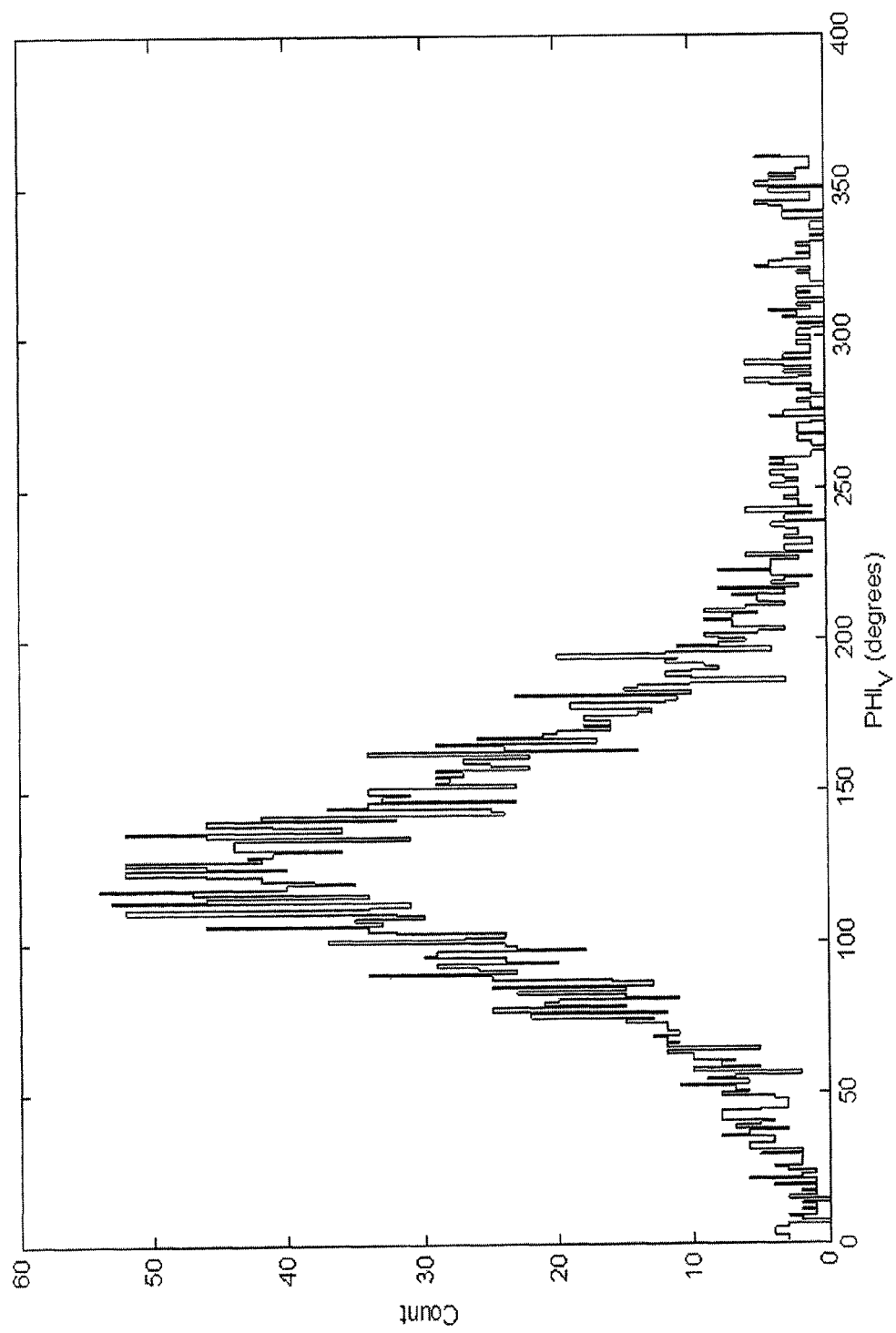
FIG. 16 depicts an exemplary histogram of differential phase values measured by a vertical channel of a dual polarization radar system, such as is depicted by FIG. 1.

In this regard, for each bin in the filtered raw measurement data (e.g., data 1400), the signal processing element 41 determines the bin's differential phase angle value by computing the arc-tangent of the cross-correlation between the horizontally and vertically polarized returns. The control processing element 52 then defines a histogram by plotting, for each differential phase angle value, the number of bins ("count") having such differential phase angle value and smoothing the curve indicated by the plot. An exemplary histogram of the differential phase values is shown by FIG. 16. In the exemplary plot shown by FIG. 16, the peak of the curve occurs at about 125 degrees. Such peak differential phase angle value is the system differential phase angle value ($\phi_{V\_System}$) while transmitting a vertical pulse only.

Figure 17:
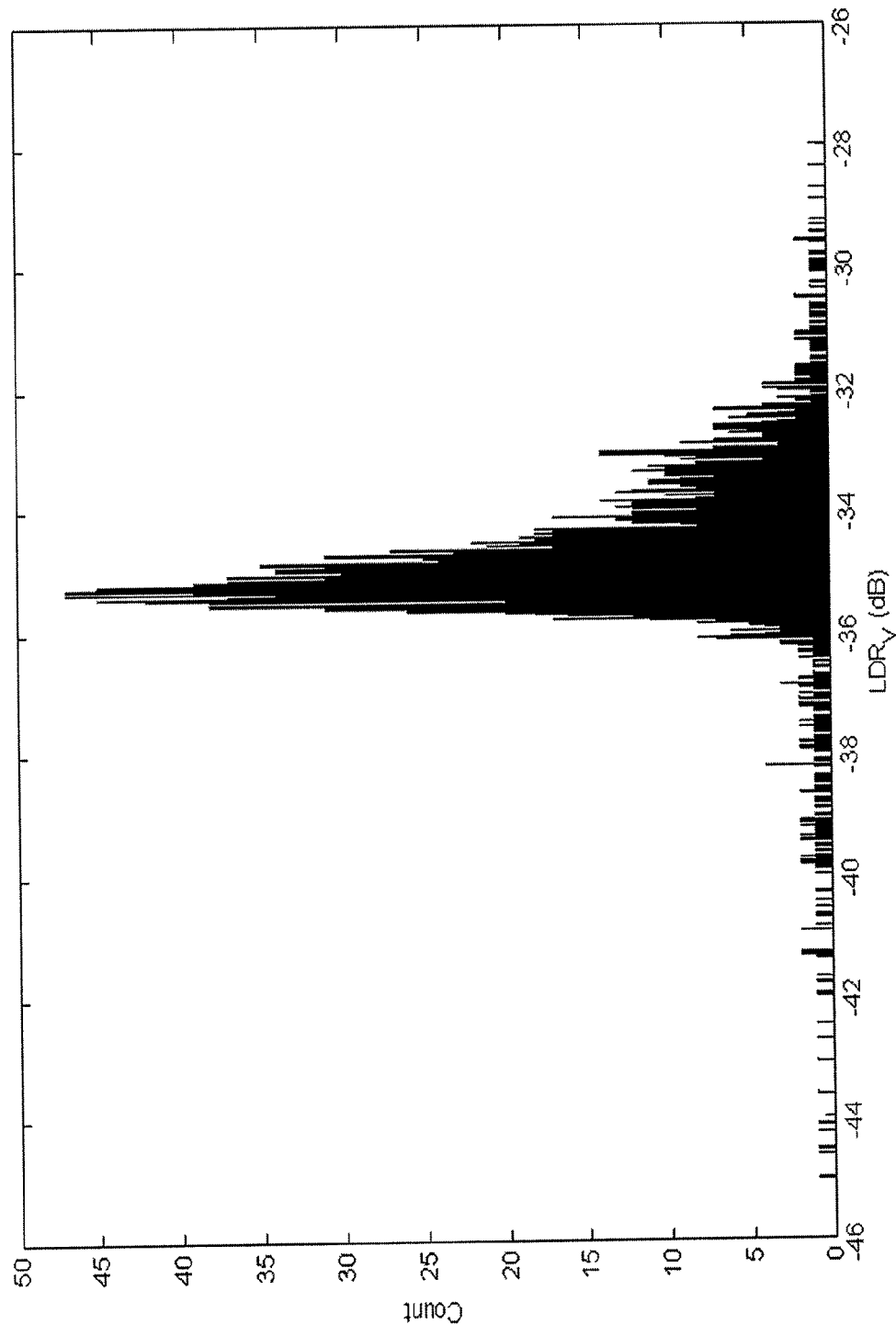
FIG. 17 depicts an exemplary histogram of differential reflectivity values measured by a vertical channel of a dual polarization radar system, such as is depicted by FIG. 1.

After determining the system differential phase angle, the control processing element 52 again filters the raw measurement data, based on $\phi_{V\_System}$ to identify bins indicative of returns from spherical objects, as shown by block 1403 of FIG. 15. After identifying the bins indicative of returns from spherical objects for the calibration process, the control processing element 52 determines the system vertical linear depolarization ratio ($L_{DRV\_System}$) by plotting a histogram of the linear depolarization ratio values of the identified bins and then selecting the peak value of the histogram to be the system linear depolarization ratio ($L_{DRV\_System}$). An exemplary histogram of the vertical linear depolarization ratio values is shown by FIG. 17. In the exemplary plot shown by FIG. 17, the peak of the curve occurs at about 0.35. Such peak linear depolarization ratio value is the system vertical linear depolarization value ($L_{DRV\_System}$). The corrected measurement data 1400 is then calibrated by subtracting the selected system linear depolarization value ($L_{DRV\_System}$) from the linear depolarization ratio measurement $L_{DRV\_Measured}$ for each bin. Accordingly, when the corrected measurement data 1400 is used to provide the weather data 84, the weather data 84 is likely to more accurately indicate the weather events in the vicinity of the radar system 20.

Now, therefore, the following is claimed:

1. A dual polarization radar system, comprising:
memory;
a transmission system configured to wirelessly transmit pulses;
a receive system configured to store, in the memory, measurement data indicative of returns from the transmitted pulses, the measurement data defining a plurality of bins comprising power values indicative of the returns; and logic configured to identify which of the bins are indicative of returns from spherical objects, wherein the logic is further configured to calibrate the dual polarization radar system based on the identified bins.

2. The dual polarization radar system of claim 1, wherein each of the pulses comprises a horizontally polarized waveform and a vertically polarized waveform.

3. The dual polarization radar system of claim 1, wherein each of the pulses comprises a first waveform and a second waveform, and wherein the first and second waveforms have polarization states perpendicular to each other.

4. The dual polarization radar system of claim 3, wherein the logic is configured to calculate, for each of the identified bins, a difference between a reflectivity value for the first waveform and a reflectivity value for the second waveform.

5. The dual polarization radar system of claim 1, wherein the logic is configured to determine a system differential reflectivity value based on the identified bins and to combine the system differential reflectivity value with at least one differential reflectivity value measured by the receive system.

6. The dual polarization radar system of claim 5, wherein each of the pulses comprises a first waveform and a second waveform, wherein the logic is configured to define a histogram of calculated differences between reflectivity values of the identified bins for the first waveform and vertical reflectivity values of the identified bins for the second waveform.

7. The dual polarization radar system of claim 6, wherein the logic is configured to identify a peak of the histogram and to determine the system differential reflectivity value based on the identified peak.

8. The dual polarization radar system of claim 1, wherein the plurality of bins comprise phase angle values for the returns, wherein the logic is configured to determine a system differential phase angle value based on the phase angle values of the plurality of bins, and wherein the logic is configured to identify which of the plurality of bins are indicative of returns from spherical objects based on the system differential phase angle value.

9. The dual polarization radar system of claim 8, wherein the logic is configured to define a histogram of calculated differences between the phase angle values for the returns.

10. The dual polarization radar system of claim 9, wherein the logic is configured to identify a peak of the histogram and to identify which of the plurality of bins are indicative of returns from spherical objects based on the identified peak.

11. A method for use in a dual polarization radar system, comprising:
wirelessly transmitting pulses;
storing, in memory, measurement data indicative of returns from the transmitted pulses, the measurement data defining bins comprising reflectivity values indicative of the returns;
identifying a plurality of the bins that are indicative of returns from spherical objects; and
calibrating the dual polarization radar system based on the identifying.

12. The method of claim 11, wherein each of the pulses comprises a first waveform and a second waveform, and wherein the first and second waveforms have polarization states perpendicular to each other.

13. The method of claim 11, wherein each of the pulses comprises a first waveform and a second waveform, wherein the method further comprises calculating for at least one of the bins a difference between a reflectivity value for the first waveform and a reflectivity value for the second waveform, and wherein the identifying is based on the calculating.

14. The method of claim 11, further comprising determining a system differential reflectivity value based on the identified bins, wherein the calibrating comprises combining the system differential reflectivity value with at least one differential reflectivity value measured by the dual polarization radar system.

15. The method of claim 14, wherein each of the pulses comprises a first waveform and a second waveform, and wherein the method further comprises defining a histogram of calculated differences between reflectivity values of the identified bins for the first waveform and vertical reflectivity values of the identified bins for the second waveform.

16. The method of claim 15, further comprising identifying a peak of the histogram, wherein the identifying the plurality of the bins is based on the peak.

17. The method of claim 11, wherein the bins defined by the measurement data comprise phase angle values for the returns, wherein the method further comprises determining a system differential phase angle value based on the phase angle values for the returns, and wherein the identifying is based on the system differential phase angle value.

18. The method of claim 17, further comprising defining a histogram of calculated differences between the phase angle values for the returns.

19. The method of claim 18, further comprising identifying a peak of the histogram, wherein the determining is based on the identified peak.

20. A method for use in a dual polarization radar system, comprising:
wirelessly transmitting pulses;
measuring returns from the transmitted pulses thereby providing a plurality of measurements;
storing, in memory, data indicative of the measurements;
determining, based on the data, whether each of the measurements is indicative of a respective spherical object;
identifying a plurality of the measurements indicative of spherical objects based on the determining; and
calibrating the dual polarization radar system based on the identifying.

21. The method of claim 20, wherein each of the pulses comprises a first waveform and a second waveform, and wherein the method further comprises:
calculating, for the identified measurements, differences between reflectivity values for the first waveform and reflectivity values for the second waveform; and
determining a system differential reflectivity value based on the calculating,
wherein the calibrating comprises combining the system differential reflectivity value with the at least one differential reflectivity value measured by the dual polarization radar system.

* * * * *